(12) United States Patent
Nava et al.

(10) Patent No.: US 9,036,291 B1
(45) Date of Patent: May 19, 2015

(54) SYSTEMS AND METHODS FOR ASYNCHRONOUS-FREQUENCY TRACKING OF DISK DRIVE ROTATIONAL VIBRATION (RV) PERFORMANCE WITH POSITION ERROR SIGNAL (PES)

(71) Applicants: Jose A. Nava, Cedar Park, TX (US); Haesung Kwon, Austin, TX (US)

(72) Inventors: Jose A. Nava, Cedar Park, TX (US); Haesung Kwon, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 14/466,529

(22) Filed: Aug. 22, 2014

(51) Int. Cl.
*G11B 5/596* (2006.01)
*G11B 19/04* (2006.01)

(52) U.S. Cl.
CPC .......... *G11B 5/59694* (2013.01); *G11B 19/042* (2013.01)

(58) Field of Classification Search
None
See application file for complete search history.

(56) References Cited

U.S. PATENT DOCUMENTS

| 7,999,520 | B2 | 8/2011 | Luo et al. |
| 8,681,440 | B1* | 3/2014 | Theimer et al. ................. 360/39 |
| 2010/0142086 | A1* | 6/2010 | Shen et al. ................. 360/78.09 |
| 2012/0275610 | A1 | 11/2012 | Lambert et al. |
| 2013/0318371 | A1 | 11/2013 | Hormuth |
| 2014/0036381 | A1 | 2/2014 | Brockie et al. |
| 2014/0192436 | A1 | 7/2014 | Kwon et al. |
| 2014/0232420 | A1 | 8/2014 | Luo et al. |
| 2014/0340787 | A1* | 11/2014 | Kwon ........................ 360/77.05 |

FOREIGN PATENT DOCUMENTS

WO     WO 99/63537     12/1999

OTHER PUBLICATIONS

Yu et al., "Method and System for Hard Disk Drive Throughput Optimization Using Position Error Signaling", U.S. Appl. No. 14/452,706, filed Aug. 6, 2014, 32 pgs.
Montero et al., "Systems and Methods for User Modification of Cooling Device Response in Information Handling Systems", U.S. Appl. No. 14/154,840, filed Jan. 14, 2014, 37 pgs.

* cited by examiner

*Primary Examiner* — Andrew L Sniezek
(74) *Attorney, Agent, or Firm* — Egan, Peterman & Enders LLP.

(57) ABSTRACT

Systems and methods are provided that may be implemented to provide a mechanical indicator to correlate magnetic disk drive IOP performance with features of mechanical and/or acoustic vibrational frequencies that are generated and captured or sensed outside of the disk drive itself. In one example, disk drive PES data may be collected concurrently with the capture of mechanical and/or acoustic vibrational data at different and progressive locations of vibration source, vibration path and vibration receiver in a disk drive operating environment, e.g., such as for disk drives installed within a server and/or storage chassis enclosure. In such case, PES threshold may be utilized to correlate performance of Drive IOP or drive servo-mechanical performance as a function of measured characteristics of vibration source/s that impart vibration to a disk drive.

20 Claims, 5 Drawing Sheets

SYSTEMS AND METHODS FOR ASYNCHRONOUS-FREQUENCY TRACKING OF DISK DRIVE ROTATIONAL VIBRATION (RV) PERFORMANCE WITH POSITION ERROR SIGNAL (PES)

FIELD OF THE INVENTION

This invention relates generally to disk drives and, more particularly, to disk drives for use with information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information systems include storage systems, such as hard disk drives. Hard disk drives (HDDs) are subject to interference from rotational vibrations (RV) that may be induced by internal components of an information handling system chassis enclosure (e.g., such as cooling fans or other hard disk drives) and from components external to the information handling system chassis enclosure (e.g., such as adjacent information handling systems and other machines). These internal and external components can be sources of vibration/excitation which provide vibrational input to the mechanical operating environment of an information handling system chassis. In some cases, this vibrational input can vary over time as operating conditions change, e.g., due to changes in cooling fan output required by chassis thermal control to maintain acceptable cooling of internal system components despite changes to the ambient temperature in which the chassis resides, the amount of operating stress applied to the central processing unit or other chipset/s or random access memory or activity of HDDs. Adjacent system components such as other HDDs or power supplies can also act as sources that generate varying amounts of vibrational input which can affect the operating environment in which a HDD operates. The path of vibrational wave propagation from such vibrational sources to a HDD enclosed within a chassis is through the mechanical chassis components which are required to support the vibrational sources, electrical components and the HDD that receives the vibrational waves.

RV interference may cause errors in reading and writing operations of a hard disk drive by moving a rotating disk relative to a read/write head of the drive, and thus displacing the head relative to a selected data track on the rotating disk. A conventional process of characterizing hard drive RV performance in enclosures is to measure acceleration outputs in disk drives and chassis locations of interest along with input/output operations per second (IOP) in an attempt to find a correlation between mechanical design parameters-mechanical resonances and IOP. The conventional mechanical design approach is focused in frequency contents to avoid unwanted frequency coupling among resonances of mechanical parts and asynchronous fan frequencies. IOP is measured using a time signal that reflects many different aspects of drive design, including firmware, mechanical, and channel design.

Position error signals (PES) are generated from hard drive servo read back signals, and may be used to correct read and write errors in real time. The PES data indicates how far the read/write heads of the hard drive are moved off-track from the default servo system coordinates at any given instance of time in order to remain in the center of the actual track.

SUMMARY OF THE INVENTION

Disclosed herein are systems and methods that may be implemented to provide a mechanical indicator to correlate disk drive IOP performance with features of mechanical and/or acoustic vibrational frequencies that are generated and captured or sensed outside of the disk drive itself. Such vibrational frequencies may be generated and sensed inside and/or outside an information handling system chassis enclosure that contains the disk drive, and may include vibrational frequencies generated by internal components of the information handling system chassis enclosure (e.g., such as cooling fans or other disk drives) and from components external to the information handling system chassis enclosure (e.g., such as adjacent information handling systems and other types of machines). The disclosed systems and methods may be advantageously implemented in one exemplary embodiment to collect disk drive PES data concurrently with the capture of mechanical and/or acoustic vibrational data at different and progressive locations of vibration source, vibration path and vibration receiver in a disk drive operating environment, e.g., such as for disk drives installed within a server and/or storage chassis enclosure. In such an embodiment, the disclosed systems and methods may utilize PES threshold to correlate performance of Drive IOP or drive servo-mechanical performance as a function of measured characteristics of vibration source/s that impart vibration to a disk drive. The disclosed systems and methods may be implemented in conjunction with any type of disk drive systems that generate PES data including, for example, magnetic disk drives such as magnetic hard disk drives (HDDs).

In one embodiment, the collected PES and sensed vibration data may be correlated to each other and used to identify one or more vibrational parameters (e.g., particular types of vibration sources, particular locations of vibration sources and/or vibration receivers, particular operating modes of vibration sources, particular vibrational propagation paths, etc.) in the collected data which adversely affect the ultimate read/write performance of a disk drive installed in the disk drive operating environments. Once such vibrational parameters are identified and correlated to adverse drive read/write performance, one or more operational parameters of an affected disk drive and/or information handling system chassis enclosure may be modified or altered to improve drive read/write performance. Such operational parameters include, but are not limited to, mounting position of a disk drive within the chassis enclosure, mounting hardware for the disk drive, positioning of external and/or internal vibration sources relative to an affected disk drive, operating speed or range of operating speed of an affected disk drive, operating speed or range of operating speed of a vibration source such as cooling fan, etc.

In one exemplary embodiment, disk drive PES data may be taken concurrently with the sensing of vibration data (e.g., mechanical and/or acoustic vibration data) taken at multiple different and progressive locations of source, path and receiver within an information handling system chassis enclosure (e.g., such as server or storage enclosure) to help identify features in such vibration data which affect the ultimate performance of disk drive/s installed within the operating environments of the information handling system enclosure. Vibration data may be sensed using, for example, contact transducers such as uniaxial or multi-axial accelerometers, or non-contact transducers such as a laser Doppler vibrometers and/or microphones placed at various locations within the server/storage chassis enclosure. In one exemplary embodiment, an understanding of the chassis operating environment may be developed to determine factors affecting the hard disk drive PES data by measuring the behavior of vibrational source/s (e.g., such as chassis fans, power supplies, other adjacent storage drives, etc.) under varying operating modes which duplicate or simulate given operating modes, the path/s (chassis internals) at varying locations between the source/s and receiver/s, and the receiver drive/s themselves as they operate in active modes. In this regard, the disclosed systems and methods may be implemented to develop a good indication of RV failure analysis for chassis and drive mechanical design that is superior to conventional IOP data that is indicative of drive RV but not that is not a good indicator of drive RV failure analysis. In this regard, even if conventional acceleration signals are captured in disk drives, it is still unknown or uncertain that the specific frequency content of the captured acceleration signals actually influence drive IOP. The rejection of external frequency contents onto drives depends upon drive servo control design.

In one embodiment, three-dimensional (3D) asynchronous-frequency tracking PES measurements may be taken in a laboratory environment where operating conditions are duplicated that are similar to operating conditions seen in the field like a data center or server closet, e.g., such as by using actual system mounting fixtures together with vibrational excitation of a server/storage chassis enclosure by external shakers or other external vibration sources (e.g., other computers, external cooling equipment, etc.) and/or by internal chassis vibration generation component sources such as air moving devices like fans or other adjacent internal components like other system disk drives, power supplies, etc. In another embodiment, 3D asynchronous-frequency tracking PES measurements may be taken in the field using a portable data acquisition system, e.g., to test an information handling system chassis and storage drive/s that are being deployed or that are already deployed and operating in a data center or server closet environment. Field testing may be desirable, for example, when external operating factors such as external excitation, higher ambient temperatures and/or loading of the chassis or a combination of these parameters is better demonstrated and tested.

In one exemplary embodiment, a portable data acquisition system may be provided that includes one or more (e.g., in one embodiment at least three) accelerometers, signal conditioning capabilities configured to power/read these accelerometer transducers, a processing device implementing analysis logic (e.g., software, firmware, etc.) configured to interpret these signals after post-processing, interface wiring to the disk drive to gather PES information, a processing device implementing interpretation logic (e.g., software, firmware, etc.) to interpret the PES information from the disk drive, and a processing device implementing control logic (e.g., software, firmware, etc.) configured to control one or more vibration sources. Such vibration sources may include, for example, fans, power supplies, other hard drives in the same information handling system chassis or fans in adjacent information handling chassis in the field. In one embodiment, such transducers/accelerometers may be mounted to the source/s of interest, along the path of vibration propagation (e.g., chassis frame components), and on the vibration receiver/s, e.g., disk drive/s.

During vibrational testing, the path of vibrational wave propagation from internal and external vibrational sources to each disk drive enclosed within a chassis may be through the mechanical chassis components which are employed to support the vibrational sources, electrical components, and each disk drive that acts as a receiver that receives the vibrational waves. Each disk drive receiver may be a HDD which is enclosed within the information handling system chassis under test and may be hard-mounted (e.g., only removable after first powering down the chassis system), or may be hot-swappable during information handling system chassis power-on conditions. In one exemplary embodiment, one or more vibration sensors may be deployed within the tested chassis to sense vibration concurrently with recording PES data generated by a storage device within the chassis while under test. Measurements may be taken in one embodiment with air moving devices such as cooling fans, for example, ramping from low to high rotational speeds or vice versa while measuring resulting PES and/or vibrational response using transducers mounted on the source/s, path and receiver/s. When performing this type of testing, the rate of increase or decrease in rotational speeds may affect how certain features are displayed in the gathered data. In such an embodiment, the rate of ramped speed increase or decrease may be held sufficiently low such that resonances, coincidences of resonances, orders of the cooling fans or other sources and/or receivers are set up.

In one respect, disclosed herein is a system, including: at least one processing device; an information handling system chassis including at least one of an enclosure, a frame, or a combination thereof; at least one magnetic disk drive mechanically coupled to the chassis, the disk drive being configured to generate position error signals (PES) data, and to provide the PES data to the at least one processing device; one or more vibration sensor components configured to sense at least one of mechanical or acoustic vibrations simultaneously with the generation of the PES data by the disk drive, and to provide sensed vibration data representative of the sensed mechanical or acoustic vibrations to the at least one processing device; and at least one vibration source configured to operate at different operational levels that produce different corresponding frequencies of vibration. The at least one processing device may be configured to at least one of: correlate a magnitude of the generated PES data with a frequency of the vibration data that is simultaneously sensed with the generated PES data, or control or sense the current operational level of the vibration source and to correlate each of multiple different operational levels of the vibration source with a frequency of the vibration data that is simultaneously sensed or controlled while the vibration source is operating at the given operational level, or a combination thereof.

In another respect, disclosed herein is a test method, including providing a system that includes: at least one processing device; an information handling system chassis including at least one of an enclosure, a frame, or a combination thereof; at least one magnetic disk drive mechanically coupled to the chassis, one or more vibration sensor components, and at least one vibration source. The method may further include: using the disk drive to generate position error signals (PES) data, and to provide the PES data to the at least one processing device; using the one or more vibration sensor components to sense at least one of mechanical or acoustic vibrations simultaneously with the generation of the PES data by the disk drive, and to provide sensed vibration data representative of the sensed mechanical or acoustic vibrations to the at least one processing device; operating the at least one vibration source at different operational levels to produce different corresponding frequencies of vibration; and using the at least one processing device to at least one of correlate a magnitude of the generated PES data with a frequency of the vibration data that is simultaneously sensed with the generated PES data, or control or sense the current operational level of the vibration source and to correlate each of multiple different operational levels of the vibration source with a frequency of the vibration data that is simultaneously sensed or controlled while the vibration source is operating at the given operational level, or a combination thereof.

In another respect, disclosed herein is a magnetic disk drive, including: a rotating platter having data tracks defined thereon; a swing arm and drive head assembly including drive heads configured to read and write data on the rotating platter relative to the rotating platter tracks; a motor coupled to move the swing arm and drive heads relative to the rotating platter; a motor controller configured to control positioning of the swing arm and drive heads relative to the rotating platter and to generate position error signals (PES) data based thereupon; and at least one processing device coupled to receive the PES data from the motor controller and further configured to be coupled to receive information representative of a current real time operational level of a vibration source. The processing device may be configured to correlate and synchronize different real time operational levels of the vibration source with corresponding respective real time PES values of the PES data that are simultaneously generated while the vibration source is operating at the different respective operational levels.

DESCRIPTION OF ILLUSTRATIVE EMBODIMENTS

Figure 1:
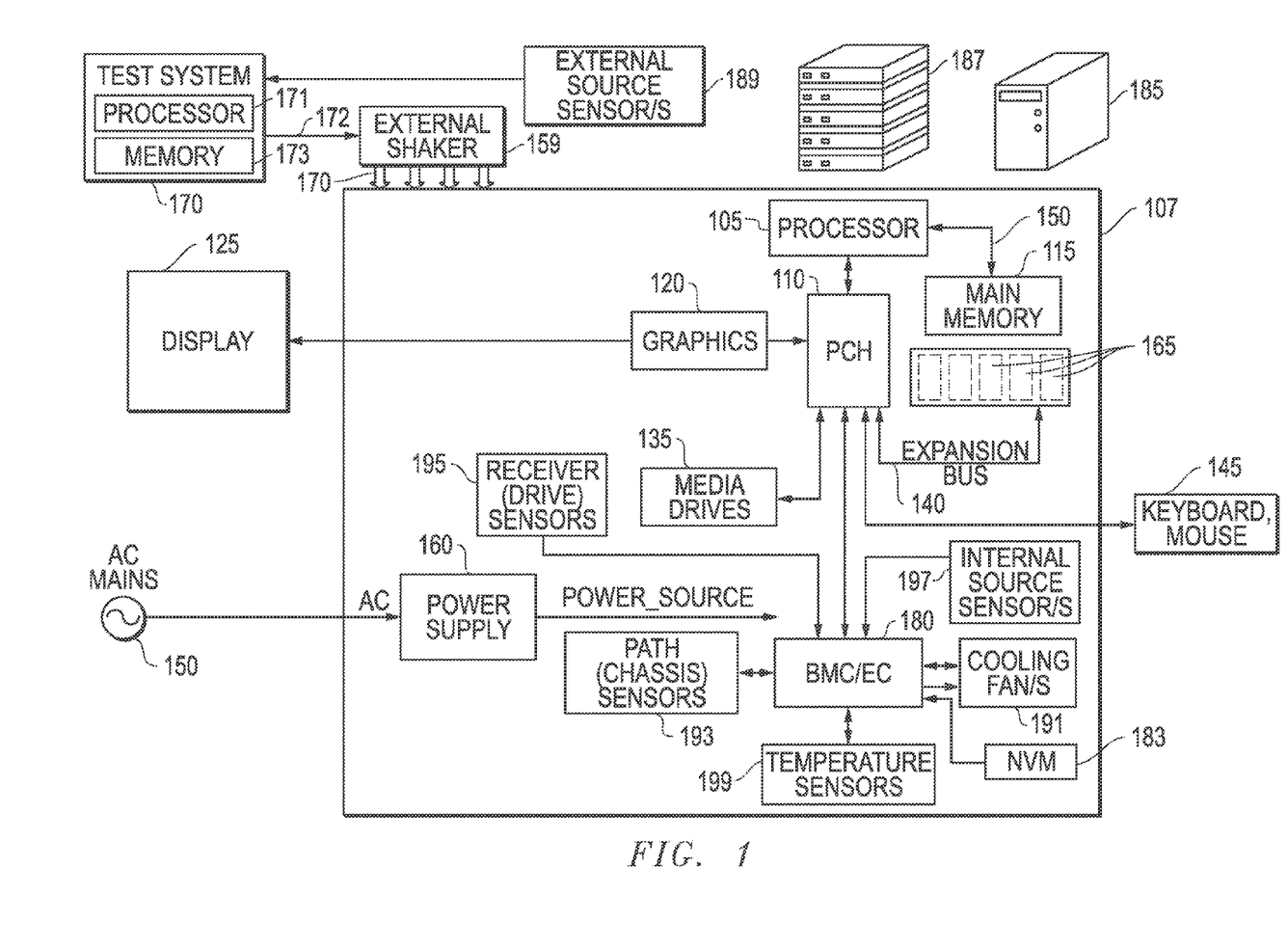
FIG. 1 is a block diagram illustrating an information handling system according to one exemplary embodiment of the disclosed systems and methods.

FIG. 1 is a block diagram of one embodiment of an information handling system (e.g., such as a desktop workstation computer, server, etc.) as it may be configured for rotational vibration testing according to one exemplary embodiment of the disclosed systems and methods. As shown, the information handling system includes one or more storage drives 102 and various other internal system components contained within a computer chassis enclosure 107. Chassis enclosure may be configured, for example, as a desktop computer tower enclosure, rack mount enclosure (e.g., 1U, 2U, . . . 5U, etc.) or any other enclosure that contains the internal components of an information handling system mechanically coupled to structural components of a chassis frame within chassis enclosure walls, it being understood that in another embodiment storage drives 102 may be mechanically coupled in an exposed (non-enclosed) position to a chassis frame. As described herein, one or more internal vibration sensor components (e.g., 193, 195, 197) may be additionally provided on or within chassis enclosure 107 to sense vibrational waves produced by internal system vibration source components (e.g., such as cooling fans 191, individual storage drives 102, and/or other rotating or otherwise active system components) and/or one or more external vibration sensors 189 may be provided on or adjacent external vibration sources such as adjacent information handling systems (e.g., server 187 and computer tower 185), other adjacent machines, and/or test equipment (e.g., external shaker 159) configured to impart external vibration 165 to the chassis 107.

It will be understood that the configuration of FIG. 1 is exemplary only, and that the disclosed systems and methods may be implemented to test any other type of information handling system that includes one or more storage drives enclosed within a computer chassis, including a portable information handling system such as a notebook or laptop computer. Further, it will be understood that sensed vibration data from internal and external vibration sensors 189, 193, 195 and 197 may be collected and analyzed together with PES data by optional external laboratory or portable test equipment 170 that includes at least one processing device 171 and memory 173 configured to perform the data collection and testing analyses described further herein. Alternatively or additionally, vibration data from internal and external vibration sensors 189, 193, 195 and/or 197 may be collected and analyzed together with PES data using one or more internal processing devices and memory components of chassis enclosure 107, such as BMC/EC 180, processor 105, NVM 183 and main memory 115.

As shown in FIG. 1, the information handling system of this exemplary embodiment includes at least one host processing device 105 which may be a central processing unit (CPU) such as an Intel Pentium series processor, an Advanced Micro Devices (AMD) processor or other type of host processing device that executes an operating system (OS) for the information handling system, e.g., Intel x86 processor, AMD x86 processor, ARM core processor, or other types of host processing devices. Host processing device 105 may be provided in one embodiment with an integrated memory controller (iMC) to facilitate memory functions, although it will be understood that a memory controller may be alternatively provided as a separate chip or other circuit in other embodiments. Still referring to the exemplary embodiment of FIG. 1, main system memory 115 (e.g., DRAM) may be coupled via DDR channel 150 as shown to host processing device 105. As shown, an optional external display 125 (e.g., LCD or LED display, touchscreen, or other suitable display device) may be coupled to an optional graphics processing unit (GPU) 120 to provide visual images (e.g., via displayed interactive graphical user interface) to a user. GPU 120 is in turn coupled to host processing device 105 via platform controller hub (PCH) 110 which facilitates input/output functions for the information handling system. It will be understood that functions of GPU 105 may alternatively or additionally be integrated within the host processing device 105 and/or that other types of graphics processing devices may be present, e.g., graphics-derivative processors such as physics/gaming processors. In a further embodiment, no graphics components or display may be present.

Still referring to FIG. 1, local storage drives 102 (e.g., one or more disk drives such as magnetic hard disk drive/s (HDDs)) may be coupled to PCH 110 and its controller chip to provide permanent storage for the information handling system. In such an embodiment, each of individual storage drives 102 may act both as a vibration source to other storage drives 102, and as a vibration receiver from other storage drives 102. Optional external input devices 145 (e.g., such as a keyboard, mouse, touchpad, touchscreen etc.) may be coupled as shown to PCH 110 and its controller chip to enable the user to interact with the information handling system and programs or other software/firmware executing thereon. An expansion bus 140 may be coupled to PCH 110 to provide the information handling system with plug-in functionality for additional components 165, such as PCI cards or other types of plug-in components, some of which may act as internal vibration sources capable of producing vibrational waves, e.g., acoustic sources such as speakers, removable disk drives such as CD and/or DVD drives, etc. Expansion bus 140 may be, for example, a PCI bus, PCI Express bus, SATA bus, USB or any other suitable expansion bus. The information handling system of FIG. 1 also includes at least one power supply component 160 that is coupled to a source of AC power, namely AC mains 150. Power supply 160 may receive AC mains current and produce a regulated DC power source for the various components of the information handling system perform power supply functions such as AC to DC conversion and voltage regulation. Power supply 160 may also act as an internal vibration source that produce vibrational waves during current conversion operation. In alternative embodiments, a system on chip ("SOC") or other type of integrated circuit may be employed that consolidates one or more of memory controller, CPU, GFX, PCI devices and other I/O into a single integrated chip.

As further shown in FIG. 1, one or more variable speed cooling fans 191 may be provided to cool various heat-generating components within chassis enclosure 107, and in this capacity also act as internal vibration sources. In this regard, it is possible that cooling fan/s 191 may be present in one or more locations to circulate air through one or more areas of enclosure 107 for purposes of cooling multiple heat-generating components within enclosure 105, and/or that one or more individual cooling fan/s 191 may be configured to each cool a particular designated heat-generating component (e.g., such as processor 105, main memory 115, PCH 110, media drives 135, GPU 120, PCI cards or other expansion devices 165, power supply 160, etc.). As previously described, in alternative embodiments other types of cooling devices (e.g., such as variable speed cooling pumps) may be substituted for cooling fans 191 or to supplement cooling fans 191, and may be controlled in a similar manner that also produces internal vibrations. Also shown present are one or more temperature sensors 199 that may be provided and configured to sense operating air temperature within one or more areas or locations of chassis enclosure 107 (e.g., such as ambient temperature at the air inlet of chassis enclosure 107) and/or that may be configured to sense temperature of particular individual heat-generating components, such as processor 105, main memory 115, PCH 110, media drives 135, GPU 120, PCI cards or other expansion devices 165, power supply 160, etc.

In the illustrated embodiment, an out-of-band processing device 180 (e.g., baseboard management controller (BMC), service processor, embedded processor, embedded controller (EC) remote access controller, etc.) may be coupled to PCH 110 and provided with persistent storage/non-volatile memory 183, although an out-of-band processing device with integrated persistent storage may also be employed. Processing device 180 and persistent storage 183 may be together configured to control fan speed of one or more cooling fans 191 based on real time system temperatures that are sensed by one or more temperature sensor/s 199, e.g., such as internal chassis air temperature, temperature/s of individual internal hardware components, etc. In this regard, a given thermal or temperature sensor 199 may be configured to sense the real time temperature of a corresponding individual hardware component and report this sensed temperature to out of band processing device 180 across a suitable data bus or other suitable communication media, e.g., continuously or at predetermined time intervals that may be unique for each component. One or more chassis temperature sensors 199 may alternatively or additionally be provided to monitor internal chassis temperatures at one or more different locations within chassis enclosure 107 (e.g., such as ambient temperature at the air inlet of the chassis 107) and report this sensed temperature to out of band processing device 180 across a suitable data bus or other suitable communication media, e.g., continuously or at suitable predetermined time intervals. In any case, frequency and/or other characteristics of vibrational waves produced by each cooling fan 191 will change as a function of time as the cooling fan speed is varied based on system cooling requirements.

As shown in FIG. 1, out-of-band processing device 180 is a separate and independent processing device from any in-band host central processing unit (CPU) such as host processing device 105 that runs the host OS of an information handling system. In this regard, out-of-band processing device 180 may operate without management of any application executing with a host OS on the host CPU. In this exemplary embodiment, persistent storage 183 may contain stored cooling device speed control information in the form of fan speed control information that is accessible by out of band processing device 180. Besides the particular embodiment of FIG. 1, it will be understood that cooling fan speed control may be implemented in other embodiments using any other suitable type and/or combination of out-of-band processing devices and/or in-band processing devices (e.g., such as host processing device 105) together with persistent storage. Moreover, it also possible that the disclosed systems and methods may be implemented with other types of information handling system configurations including portable information handling systems, such as notebook or laptop computers.

Still referring to FIG. 1, one or more internal vibration sensors 193, 195 and/or 197 may be deployed within chassis enclosure 107 in selected positions for sensing characteristics (e.g., frequency, magnitude, etc.) of vibrations imparted to chassis 107 from vibration sources that are internal and/or external to chassis 107 concurrently with recording PES data generated by a storage device 102 within the chassis 107 while under test. The PES data indicates how far the read/write heads of the storage device 102 are being moved off-track from the default servo system coordinates of the storage device 102 at any given instance of time in order to remain in the center of the actual track. In the illustrated embodiment, one or more internal source vibration sensors 197 may be mounted to sense vibrational waves produced at the location of one or more internal vibration sources, such as cooling fans 191 or any other vibration source (e.g., power supply 160, individual disk drives 102 or other types of rotating storage drives, etc.). One or more external source vibration sensors 189 may be mounted to sense vibrational waves produced at the location of one or more external vibration source 159, 185, 187, etc. In this regard, source vibration sensors 197 and 189 may be attached in one embodiment directly to an individual vibration source or otherwise mounted to directly measure vibration produced by an individual vibration source.

As further shown in FIG. 1, one or more path vibration sensors 193 may be mounted to sense vibrational waves transmitted through one or more portions and/or locations of the mechanical frame of chassis enclosure 107. Examples of positions where path vibration sensors 193 may be mounted include, but are not limited to, the fan gantry adjacent to the fan source, the chassis base adjacent to the source(s) which are the system fans and the power supply fans, chassis base adjacent to the receiver(s), the hard disk drive bay wall(s) adjacent to the receiver(s), etc. Additionally, one or more receiver vibration sensors 195 may be mounted to sense vibrational waves received at the location of one or more vibration receivers, such as disk drives 102. In this regard, receiver vibration sensors 195 may be attached in one embodiment directly to an individual vibration receiver or otherwise mounted within chassis 107 to directly measure vibration received by an individual vibration receiver. In one embodiment, one or more sensors 193 and 195 may be mounted with a bonding agent like cyanoacrylate to be able to capture all frequencies of interest.

Further shown in FIG. 1 are optional external vibration sources (e.g., tower computer system 185 and rack server system 187) such as may be present in a data center or office environment, and which may be positioned adjacent information handling system chassis 107 such that vibrational sources within these sources 185 and 187 transfer vibrational waves to information handling system chassis 107. As further shown, an optional external vibration source (in this case in the form of mechanical shaker 159) may be present to intentionally transfer vibrational waves 170 to chassis 107 during vibrational testing, e.g., in response to control signals 172 from a test controller.

During vibrational testing of an information handling system chassis enclosure 107, varying operating modes of the chassis 107 may be simulated in one embodiment by varying the vibrational output of the various internal or external vibration sources, e.g., rotational speed of the moving devices such as cooling fans 191. For example, higher rotational speeds of air moving devices simulate operation under higher stress levels of internal components or operation associated in higher ambient temperatures. In any case, 3D asynchronous-frequency tracking PES measurements may be taken during either or both of steady state operating conditions of internal and/or external vibration source/s and varying (e.g., ramping up and/or down) of these source/s. For example, in the case of cooling fans 191, vibrational and PES measurements may be concurrently taken at constant air moving device rotational speeds simulating normal operating conditions which may be at relatively lower rotational speeds (RPMs), and then repeating vibrational measurements at increased rotational speeds to simulate more extreme conditions such as when the internal components of the information handling system are operating in a range of higher ambient or internal temperatures.

Figure 2:
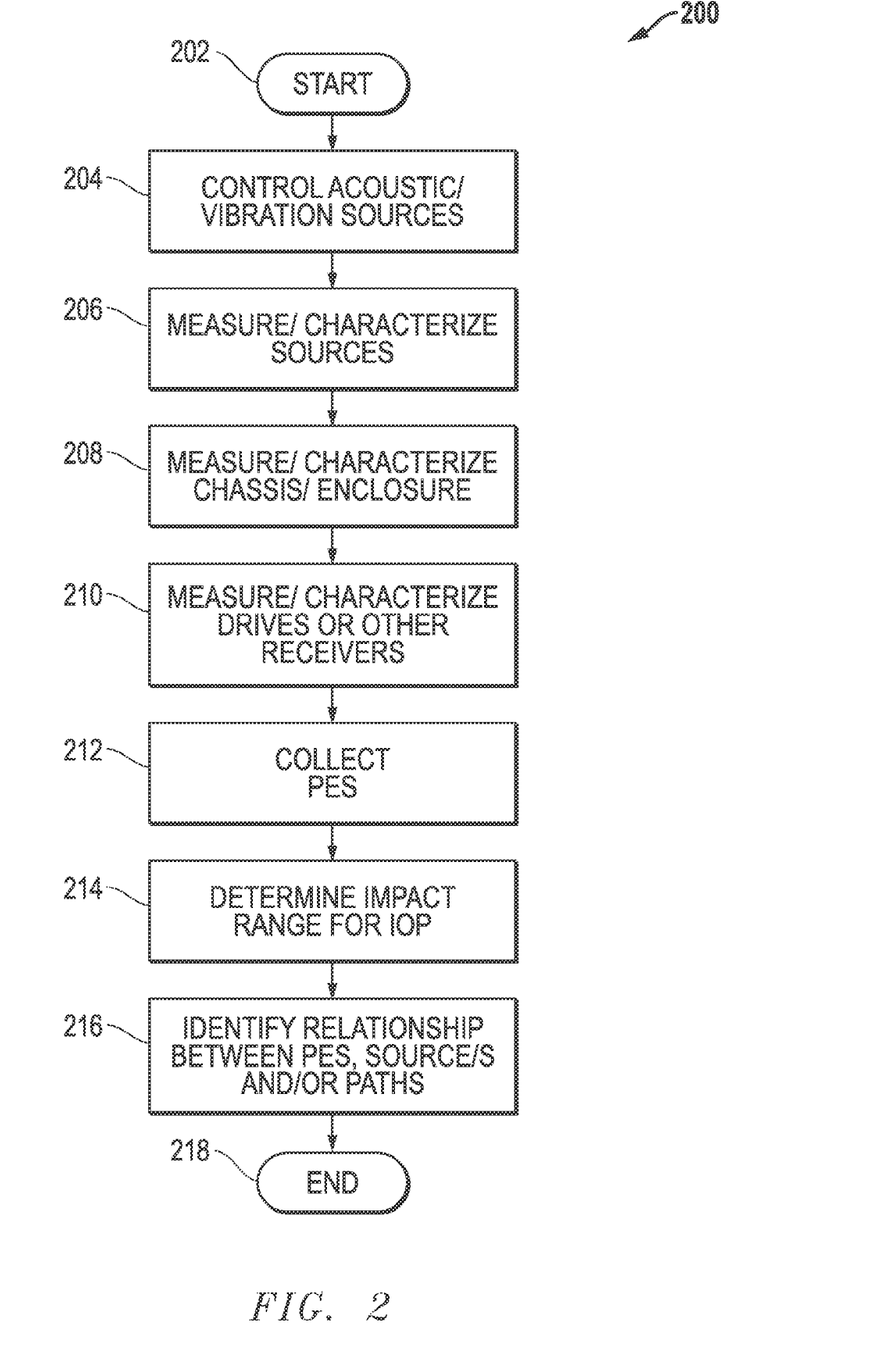
FIG. 2 illustrates methodology according to one exemplary embodiment of the disclosed systems and methods.

FIG. 2 illustrates one exemplary embodiment of a vibrational testing methodology 200 that may be implemented in the laboratory or field for vibrational testing of one or more disk drives contained within an information handling system chassis enclosure 107 such as illustrated and described in relation to FIG. 1. Although described below with reference to information handling system chassis 107 of FIG. 1, it will be understood that the steps of methodology 200 may be applied to test any other configuration of information handling system chassis that includes one or more disk drives mounted to a chassis frame that acts as path for vibration from other internal and/or external vibration sources.

As shown in FIG. 2, methodology 200 starts in step 202 and begins in step 204 by establishing manual control of one or more internal vibration sources (e.g., such as cooling fans 191, power supply 160, other storage drives 102, etc.) and/or one or more external vibration sources (e.g., such as external shaker 159, rack server system 187, tower computer 185, etc.). Control of internal vibration sources may be established, for example, by a user via optional input devices 145 (e.g., such as a keyboard, mouse, touchpad, touchscreen etc.). Control of external vibration sources may be established, for example, by control signals 172 provided to external shaker 159 and/or by suitable user-input to server system 187 and/or computer system 185.

Next, in steps 206-210, vibration data induced by the internal and/or external vibration sources may be measured and characterized, e.g., at different speeds or other type of level of operation of the vibration sources. This may be accomplished, for example, by ramping from low to high rotational speeds (or power levels) and/or vice versa while at the same time measuring resulting vibrational response using transducers mounted on the source/s, path and receiver/s. When performing this type of testing, the rate of increase or decrease in rotational speeds may affect how certain vibrational features are displayed in the gathered data. In such an embodiment, the rate of ramped speed increase or decrease may be held sufficiently low such that resonances, coincidences of resonances, orders of the cooling fans or other vibration sources and/or receivers are set up.

For example, in step 206, vibration produced by each of the internal and/or external vibration sources may be measured and characterized (e.g., one at a time) using internal source sensor/s 197 and/or external source sensor/s 189 by measuring different vibration levels produced by each vibration sensor, e.g., at different speeds or other type of level of operation. Likewise, vibration transmitted through the vibrational paths of chassis enclosure 107 from each of the various vibration sources may be similarly measured and characterized using path vibration sensors 193 in step 208. In step 210, vibration received at one or more drives 102 via the vibrational paths of chassis 107 may be similarly measured and characterized for each internal and/or external vibration source using receiver vibration sensors 195 in step 208. In this way, a relationship between vibration level and various operating levels (e.g., rotational speeds, power levels, etc.) may be characterized for each internal and/or external vibration source, and saved in memory (e.g., test system memory 173, memory 183 or 115 of chassis 107, etc.) for future use. It will be understood that steps 206-210 may be performed in the indicated sequence, performed concurrently, or in any other suitable order.

Still referring to FIG. 2, methodology continues in step 212 where PES data is collected in one or more disk drives 102 concurrently with varying operating levels (e.g., rotation speeds, power levels, etc.) of the internal and/or external vibration sources across their operating speed range or other range of operational levels. During step 212, read and/or write commands may be sent to disk drive/s 102 to cause disk drive/s 102 to generate PES data in step 212. For example, in a manner similar to methodology of steps 206-210, internal and/or vibration sources may be ramped from low to high rotational speeds and/or vice versa while at the same time collecting PES data from each drive 102 under test. The collected PES data may be stored internally (e.g. in memory 115 or 183) and/or in external test system memory 173. As before, when performing this type of testing, the rate of increase or decrease in rotational speeds may affect how certain features are displayed in the gathered PES data. In such an embodiment, the rate of ramped speed increase or decrease may be held sufficiently low such that resonances, coincidences of resonances, orders of the cooling fans or other sources and/or receivers are set up. Further information on PES generation and collection is described herein in relation to FIG. 3. In one exemplary embodiment, vibration data may be collected simultaneously from one or more of sensors 189, 193, 195 and/or 197 at the same time that PES data is collected in step 212. In another exemplary embodiment step 212 may be performed separately from steps 206-210.

Next, in step 214, collected data from steps 204-210 may be processed to determine vibrational frequency range impact on operations (e.g., such as input/output operations per second (IOP)) of each tested drive 102. For example, a given critical range of rotational speed (or other operational level such as power level) may be identified for each given vibration source where IOP of a given drive 102 are most adversely impacted. This may be done, for example, by correlating vibration levels of the vibration sources where the collected PES data indicates that IOP is most severely impacted, and then by correlating these identified vibration levels with the corresponding rotational speed or other operational level of each vibration source such as by using the 3-D waterfall plots of FIGS. 4 and 5, or other suitable technique and/or data relationship between vibration levels, rotational speed (or other operational level), and a measure or characterization of IOP performance such as PES.

In step 216, the relationship between PES, vibration source operating level (e.g., RPM or power level) multiples, and chassis acceleration/vibration responses (e.g., inherent resonances) may be evaluated. In one exemplary embodiment, fan related orders may be shown graphically in both PES and vibration response 3D waterfall plots and may be correlated between the two different types of data. Along with these, inherent resonances may be identified in the same waterfall plots as fan orders may excite these inherent resonances when fan orders are coincident. Vibration frequency trends may also be identified in one embodiment. In this way, the vibrational characteristics that are the primary cause of drive errors may be identified. The evaluation of this step may also be performed by, for example, using the collected data to create 3D waterfall plots such as hypothetically illustrated in FIGS. 4 and 5, which are described further below. Methodology 200 may then terminate in step 218, after which one or more changes in internal mechanical hardware configuration of chassis enclosure 107, external configuration of adjacent external vibration sources, and/or operating parameter configuration (e.g., allowed operating levels or operating level ranges) for one or more of the tested vibration sources may be established or changed based on the results of methodology 200 in order to minimize or reduce adverse effects on IOP (e.g., so as to increase the average IOP under operating conditions for drive components 102 of chassis enclosure system 107.

It will be understood that the particular number and order of steps in methodology 200 are exemplary only, and that any other combination of fewer, additional, and/or alternative steps may be employed that is suitable for implementing vibrational testing of chassis drive components by measuring vibrational and PES data in order to determine relationship between vibration source operations and IOP performance.

Figure 3:
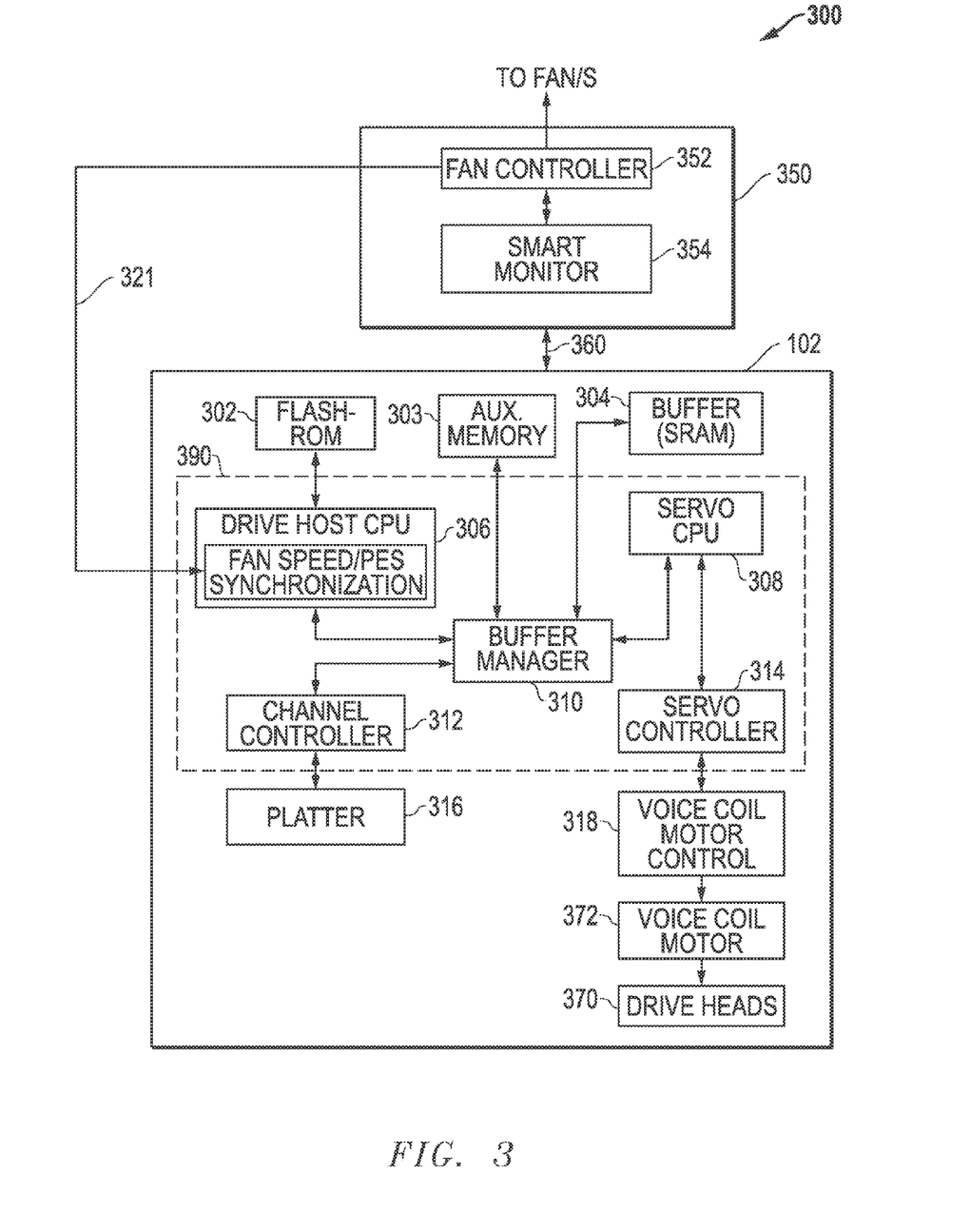
FIG. 3 is a block diagram illustrating a system architecture according to one exemplary embodiment of the disclosed systems and methods.
Figure 4:
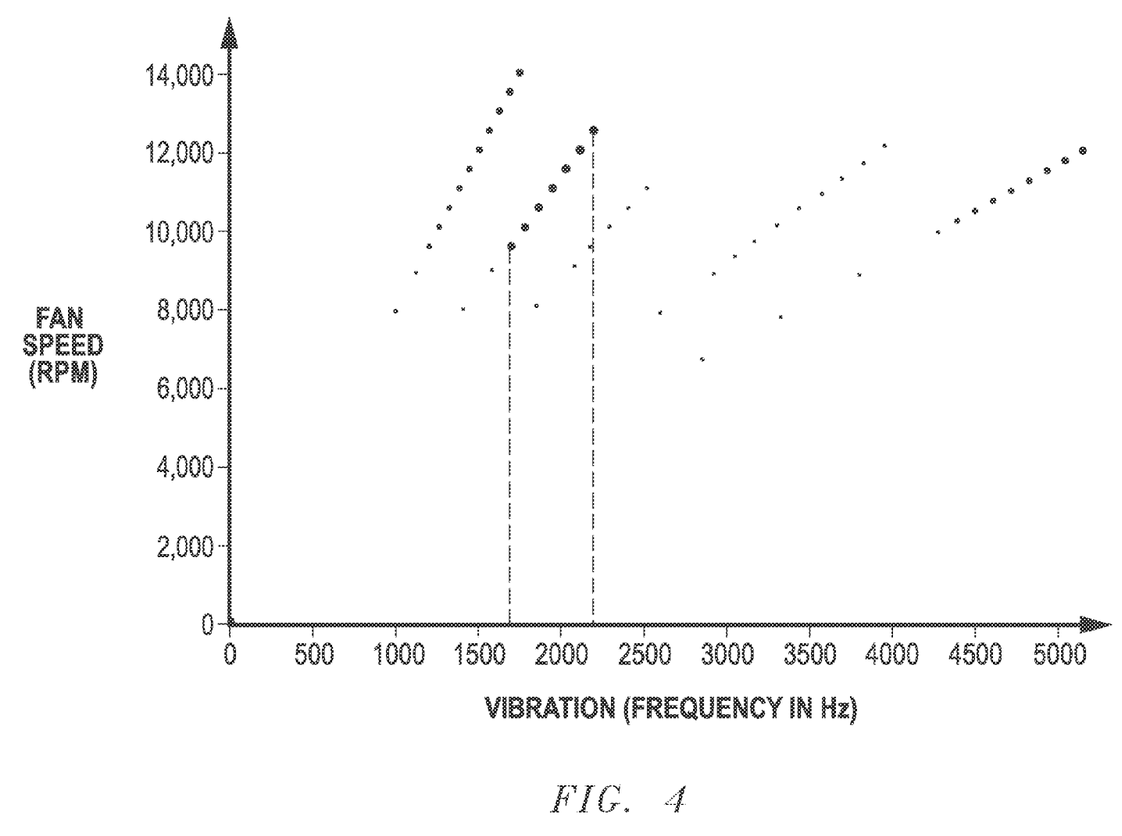
FIG. 4 illustrates a hypothetical plot of vibration frequency response as a function of cooling fan rotation speed in RPM according to one exemplary embodiment of the disclosed systems and methods.
Figure 5:
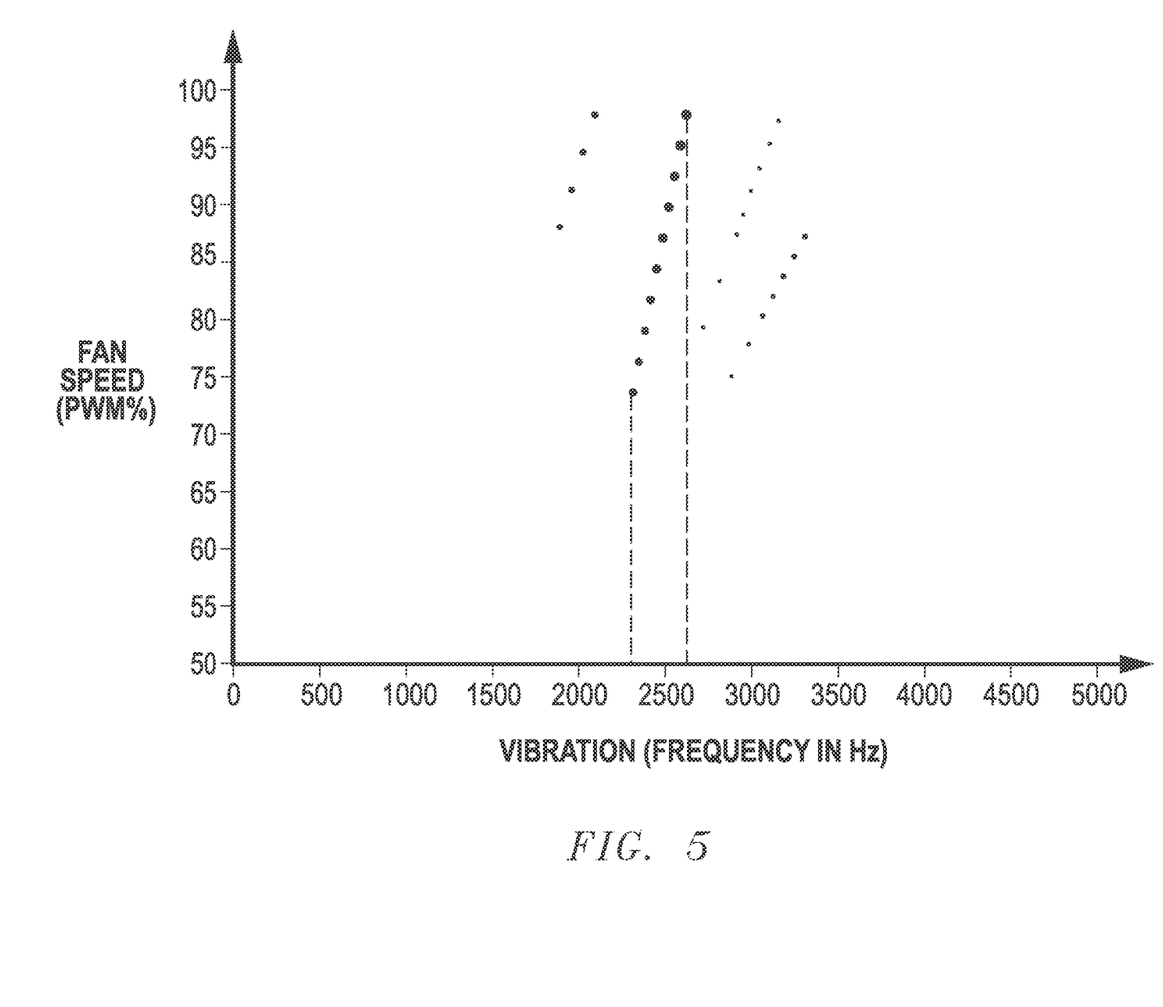
FIG. 5 illustrates a hypothetical plot of collected PES data as a function of cooling fan PWM % together with vibration response according to one exemplary embodiment of the disclosed systems and methods.

FIG. 3 illustrates one exemplary embodiment of a system architecture 300 in which processing and drive components of an information handling system may be together configured to recognize internal cooling fan speeds and to synchronize drive PES collection duty time with the specific real time fan speed of the internal fans, e.g., as the fan speed is controlled to go up and/or down monotonically to build 3D Asynchronous Frequency data such as illustrated in FIGS. 4 and 5. Such an embodiment may be optionally implemented in one embodiment to operate within information handling system chassis enclosure 107 itself so as to reduce testing time for drive/s 102 such as may carried out according to the embodiments of FIGS. 1 and 2. Although described in relation to vibration sources that are implemented as cooling fans, it will be understood that a similar architecture may be employed for testing drives 102 with other types of internal vibration sources, such as power supplies.

As shown, in the embodiment of FIG. 3, disk drive 102 includes a hard drive controller 390 that controls operation of rotating magnetic or optical drive platter 316 using read/write channel controller 312 and a servo controller 314 of the servo system that operates with voice coil motor controller (e.g., chipset) 318 to control a voice coil motor 372 to position swing arm and drive heads 370 relative to the rotating platter 316 to read data from (and write data to) substantially concentric data tracks defined on the platter according to default servo system coordinates. Operation of the read/write channel controller 312 and servo controller 314 are in turn controlled by drive host CPU processing device 306 through buffer manager 310 and servo CPU 308 of the servo system as shown. Also provided are memory 302 (e.g., Flash ROM) for drive host CPU 306 and buffer (e.g., static random-access memory SRAM) 304 coupled to buffer manager 310. In one embodiment, an optional additional auxiliary memory device 303 (NVRAM, SRAM, etc.) may be provided, e.g., in cases where disk drive on-board buffer memory 304 is not large enough to support the size of PES data to be collected.

Still referring to FIG. 3, a host information handling system 350 (e.g., server, desktop or tower computer, notebook computer, etc. such as illustrated in FIG. 1) includes fan controller 352 and Self-Monitoring, Analysis and Reporting Technology (SMART) monitor 354 that are coupled to provide real time vibration source operational level information in the form of fan speed information via data bus 321 to a fan speed/PES synchronization algorithm that is stored on Flash ROM 302 and implemented by drive host CPU 306 to synchronize real time fan speed as it changes with real time PES data. PES data is collected through the servo controller and server CPU based on data fed back from the voice coil motor control chipset 318. The synchronized operational level/PES data may be initially stored in buffer 304 and then transferred to auxiliary memory device 303 for storage so as to determine a correlation between fan speed and PES/IOP that may be stored in step 214 of FIG. 2, e.g., for later correlation in step 216 with sensed vibration data.

Further information on possible configurations and implementations of SMART monitor 354 and fan controller 352 as part of a host information handling system 350 (as well as possible configuration and inter-relation between components of a host information handling system 350 and components of a storage drive 102) may be found described in United States Patent Application Publication No. 2014/0192436A1, which is incorporated herein by reference in its entirety for all purposes. In this regard, tasks of each of fan controller 352 and SMART monitor 354 may be implemented in one embodiment by a separate processing device. Further, in one exemplary embodiment tasks of SMART monitor 354 may be implemented by a processing device configured as a health monitor that is communicatively coupled to host information handling system host processing device 105, and that is configured to control and/or monitor one or more components of storage device 102. In another exemplary embodiment, one or more functionalities of SMART monitor 354 may be optionally embodied within host processing device 105.

FIG. 4 illustrates a hypothetical three-dimensional (3D) waterfall plot of the chassis path vibration frequency response in hertz (Hz) sensed at a given measurement point on a system chassis 107 by a given path sensor 193 as a function of cooling fan rotation speed in RPM as may be obtained using the testing methodology 200 of FIG. 2. In FIG. 4, the z-axis is depicted by greater darkness of plotted data which represents increasing frequency vibration amplitude. In the example of FIG. 4, peak vibration frequency range at the location of the given path sensor 193 is from about 1700 Hz to about 2200 Hz. FIG. 5 illustrates a hypothetical three-dimensional (3D) waterfall plot of the collected PES as a function of cooling fan PWM % together with vibration response in Hz sensed at the same given measurement point on a system chassis 107 by the same path sensor 193 as the data in FIG. 4. The z-axis in FIG. 5 is depicted by greater darkness of plotted data which represents increasing PES data magnitude that correlates to IOP drops of a tested drive 102. In the example of FIG. 4, peak PES (or IOP drop out range) range at the location of the given path sensor 193 is from about 2250 to about 2500 Hz as illustrated by the dashed lines in FIG. 5. By comparing the two plots it may be determined that cooling fan speed of from about 75% to about 95% PWM and corresponding vibrational frequency of from about 2250 to about 2500 Hz is the source of high PES amplification and accordingly a high IOP drop. Having identified this problem chassis path frequency range, mechanical and operational design or installation configuration of a tested information handling system 107 may be altered to avoid this problem frequency range, e.g., by substituting different cooling fan or other vibration type (e.g., with a cooling fan having different air moving capacity, having different rotational speed and/or number of blades, etc.), different cooling fan or other vibration source location (e.g., different mounting point to the chassis frame or different positioning of external vibrational source relative to chassis 107), different type of chassis mount for cooling fan or other vibration source (e.g., different stiffness or mount, different mount vibrational isolation, etc.), etc.

It will be understood that one or more of the tasks, functions, or methodologies described herein (e.g., including those described for test system processing device 171, hard drive controller 390, host processing device 105, BMC/EC 180, fan controller 352 and/or smart monitor 354) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform one or more steps of the methodologies disclosed herein. A computer program of instructions may be stored in or on the non-transitory computer-readable medium accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A system, comprising:
   at least one processing device;
   an information handling system chassis including at least one of an enclosure, a frame, or a combination thereof;
   at least one magnetic disk drive mechanically coupled to the chassis, the disk drive being configured to generate position error signals (PES) data, and to provide the PES data to the at least one processing device;
   one or more vibration sensor components configured to sense at least one of mechanical or acoustic vibrations simultaneously with the generation of the PES data by the disk drive, and to provide sensed vibration data representative of the sensed mechanical or acoustic vibrations to the at least one processing device; and
   at least one vibration source configured to operate at different operational levels that produce different corresponding frequencies of vibration;

where the at least one processing device is configured to at least one of:
- correlate a magnitude of the generated PES data with a frequency of the vibration data that is simultaneously sensed with the generated PES data, or
- control or sense the current operational level of the vibration source and to correlate each of multiple different operational levels of the vibration source with a frequency of the vibration data that is simultaneously sensed or controlled while the vibration source is operating at the given operational level, or
- a combination thereof.

2. The system of claim 1, where the generated PES data has greater and lesser values of magnitude; and where the processing device is further configured to:
- determine one or more values of sensed vibration frequency that correspond to one or more generated PES values of greater magnitude; and
- determine one or more vibration source operation levels of the vibration source that correspond to the one or values of sensed vibration frequency.

3. The system of claim 1, where the chassis comprises a chassis frame disposed inside a chassis enclosure; and where the vibration source is an internal vibration source that is mechanically coupled to the chassis frame.

4. The system of claim 3, where the vibration sensor components comprise at least one vibration source sensor component coupled to sense vibration of the vibration source, at least one vibration path sensor component coupled to sense vibration of the chassis frame, and at least one vibration receiver sensor component coupled to sense vibration of the disk drive.

5. The system of claim 1, where the generated PES data has greater and lesser values of magnitude; and where the processing device is further configured to:
- identify a range of one or more values of sensed vibration frequency that correspond to one or more generated PES values of greater magnitude; and
- correlate the identified range of vibration frequency with the corresponding operational level of the vibration source.

6. The system of claim 1, where the processing device is a host CPU of the disk drive that is coupled to receive a current given operational level of the vibration source and to correlate the current given operational level of the vibration source with a value of PES data that is simultaneously sensed while the vibration source is operating at the current given operational level.

7. The system of claim 1, where the vibration source is an external vibration source positioned to transfer vibrational waves to the chassis.

8. The system of claim 1, further comprising an external test system that includes the processing device, the processing device of the external test system being coupled to control the external vibration source.

9. A test method, comprising:
providing a system that includes:
- at least one processing device,
- an information handling system chassis including at least one of an enclosure, a frame, or a combination thereof,
- at least one magnetic disk drive mechanically coupled to the chassis,
- one or more vibration sensor components, and
- at least one vibration source;

using the disk drive to generate position error signals (PES) data, and to provide the PES data to the at least one processing device;

using the one or more vibration sensor components to sense at least one of mechanical or acoustic vibrations simultaneously with the generation of the PES data by the disk drive, and to provide sensed vibration data representative of the sensed mechanical or acoustic vibrations to the at least one processing device;

operating the at least one vibration source at different operational levels to produce different corresponding frequencies of vibration; and using the at least one processing device to at least one of:
- correlate a magnitude of the generated PES data with a frequency of the vibration data that is simultaneously sensed with the generated PES data, or
- control or sense the current operational level of the vibration source and to correlate each of multiple different operational levels of the vibration source with a frequency of the vibration data that is simultaneously sensed or controlled while the vibration source is operating at the given operational level, or
- a combination thereof.

10. The method of claim 9, where the generated PES data has greater and lesser values of magnitude; and where the method further comprising using the at least one processing device to:
- determine one or more values of sensed vibration frequency that correspond to one or more generated PES values of greater magnitude; and
- determine one or more vibration source operation levels of the vibration source that correspond to the one or values of sensed vibration frequency.

11. The method of claim 9, where the chassis comprises a chassis frame disposed inside a chassis enclosure; and where the vibration source is an internal vibration source that is mechanically coupled to the chassis frame.

12. The method of claim 11, where the vibration sensor components comprise at least one vibration source sensor component coupled to sense vibration of the vibration source, at least one vibration path sensor component coupled to sense vibration of the chassis frame, and at least one vibration receiver sensor component coupled to sense vibration of the disk drive.

13. The method of claim 9, where the generated PES data has greater and lesser values of magnitude; and where the method further using the processing device to:
- identify a range of one or more values of sensed vibration frequency that correspond to one or more generated PES values of greater magnitude; and
- correlate the identified range of vibration frequency with the corresponding operational level of the vibration source.

14. The method of claim 13, further comprising making one or more changes in at least one of internal mechanical hardware configuration of the information handling system chassis, external configuration of adjacent external vibration sources, and/or operating parameter configuration for the vibration source based on the correlation of vibration source operational level with vibration frequency.

15. The method of claim 9, where the processing device is a host CPU of the disk drive; and where the method further comprises using the host CPU to receive a current given operational level of the vibration source and to correlate the current given operational level of the vibration source with a value of PES data that is simultaneously sensed while the vibration source is operating at the current given operational level.

16. The method of claim 9, where the vibration source is a vibration source external to the information handling system chassis; and where the method further comprises using the external vibration source to transfer vibrational waves to the chassis.

17. The method of claim 9, further comprising:
providing a test system external to the information handling system chassis, the external test system including the at least one processing device; and
using the processing device of the external test system to control the external vibration source.

18. A magnetic disk drive, comprising:
a rotating platter having data tracks defined thereon;
a swing arm and drive head assembly including drive heads configured to read and write data on the rotating platter relative to the rotating platter tracks;
a motor coupled to move the swing arm and drive heads relative to the rotating platter;
a motor controller configured to control positioning of the swing arm and drive heads relative to the rotating platter and to generate position error signals (PES) data based thereupon; and
at least one processing device coupled to receive the PES data from the motor controller and further configured to be coupled to receive information representative of a current real time operational level of a vibration source;
where the processing device is configured to correlate and synchronize different real time operational levels of the vibration source with corresponding respective real time PES values of the PES data that are simultaneously generated while the vibration source is operating at the different respective operational levels.

19. The disk drive of claim 18, where the rotating platter is a magnetic platter.

20. The disk drive of claim 18, further comprising at least one memory device coupled to the processing device; and where the processing device is configured to store the synchronized operational level/PES data on the memory device.

* * * * *